United States Patent
Meinders et al.

(10) Patent No.: US 6,528,138 B2
(45) Date of Patent: Mar. 4, 2003

(54) OPTICAL INFORMATION MEDIUM

(75) Inventors: Erwin Rinaldo Meinders, Eindhoven (NL); Hermanus Johannes Borg, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/899,442

(22) Filed: Jul. 5, 2001

(65) Prior Publication Data
US 2002/0018870 A1 Feb. 14, 2002

(30) Foreign Application Priority Data
Jul. 12, 2000 (EP) .............................. 00202492

(51) Int. Cl.[7] ................................ B32B 3/02
(52) U.S. Cl. .................... 428/64.1; 428/64.5; 428/64.6; 430/270.13
(58) Field of Search ................ 428/64.1, 64.4, 428/64.5, 64.6, 913; 430/270.13, 495.1, 945; 369/283, 288

(56) References Cited

U.S. PATENT DOCUMENTS

| | | | | |
|---|---|---|---|---|
| 5,862,121 A | * | 1/1999 | Suzuki | 369/275.1 |
| 6,027,594 A | * | 2/2000 | Nishiuchi | 156/182 |
| 6,190,750 B1 | * | 2/2001 | Wierenga | 428/64.1 |
| 2002/0119278 A1 | * | 8/2002 | Bechevet | 428/64.4 |

* cited by examiner

Primary Examiner—Elizabeth Mulvaney
(74) Attorney, Agent, or Firm—Michael E. Belk

(57) ABSTRACT

The optical information medium for rewritable recording by means of a laser-light beam (14, 15) has a first recording stack (8) having a phase change type recording layer (10), sandwiched between two dielectric layers (9, 11), and has a second recording stack having a phase change type recording layer (5), sandwiched between two dielectric layers (3, 5). A transparent spacer layer (7) is interposed between the first recording stack (8) and the second recording stack (2). A metal mirror layer (3) is present proximate the second recording stack (2) at a side remote from the transparent spacer layer (7). The first recording stack (8) has a phase change type recording layer (10) with substantially growth dominated or substantially nucleation dominated crystallization. The second recording stack (2) has a phase change type recording layer (5) of a kind different from the kind selected for the first recording stack (8). An optimal recording and erasing behavior is achieved with a laser-light write pulse strategy and a recording velocity which are substantially equal for the recording layers (5, 10).

7 Claims, 1 Drawing Sheet

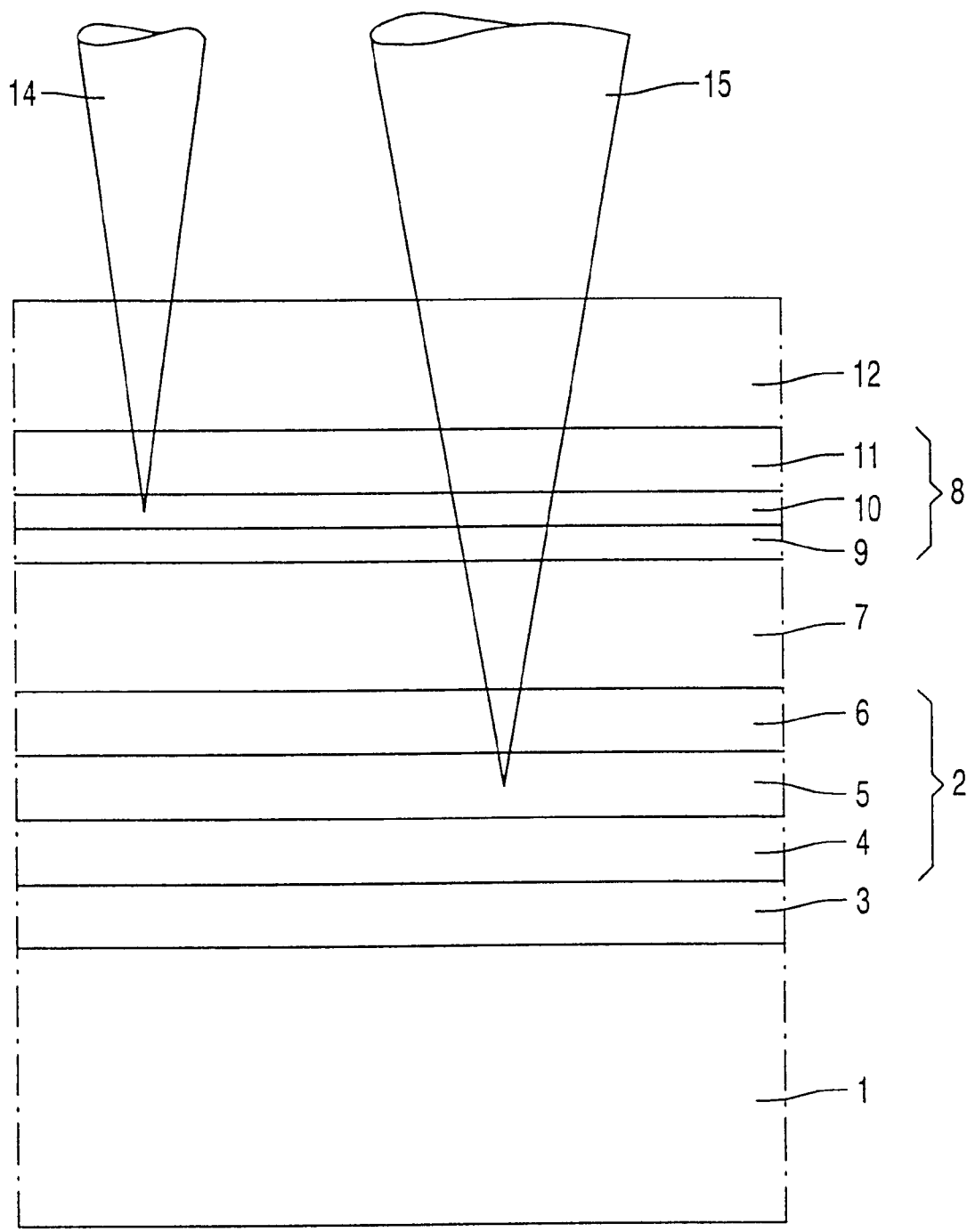

OPTICAL INFORMATION MEDIUM

The invention relates to an optical information medium for rewritable recording by means of a laser-light beam, said medium comprising a substrate having disposed on a side thereof:
- a first recording stack comprising a phase change type recording layer, sandwiched between two dielectric layers,
- a second recording stack comprising a phase change type recording layer, sandwiched between two dielectric layers,
- a transparent spacer layer, interposed between the first and the second recording stack, having a thickness larger than the depth of focus of the laser-light beam, and
- a metal mirror layer proximate the second recording stack and at a side of the second recording stack remote from the transparent spacer layer.

Such an optical information medium is known from U.S Pat. No. 6,190,750. Said patent describes an optical information medium for single-sided double layer recording.

Optical data storage based on the phase change principle is attractive, because it combines the possibilities of direct overwrite (DOW) and high storage density with easy compatibility with read-only optical data storage systems. Phase-change optical recording involves the formation of submicrometer-sized amorphous recording marks in a crystalline film using a focused relatively high power laser-light beam. During recording information, the medium is moved with respect to the focused laser-light beam that is modulated in accordance with the information to be recorded. Due to this, quenching takes place in the phase-change recording layer and causes the formation of amorphous information marks in the exposed areas of the recording layer that remains crystalline in the unexposed areas. Erasure of the amorphous marks is realized by recrystallizing through heating with the same laser at an intermediate power level, without melting the recording layer. The amorphous marks represent the data bits, which can be read, e.g. via the substrate, by a low-power focused laser-light beam. Reflection differences of the amorphous marks with respect to the crystalline unexposed areas of the recording layer bring about a modulated laser-light beam which is subsequently converted by a detector into a modulated photocurrent in accordance with the recorded digital information.

It is an aim to increase the storage capacity of optical recording media like DVD-Rewritable and DVR (Digital Video Recorder) on a single-sided disc. This can be achieved by reducing the laser-light wavelength $\lambda$, and/or increasing the numerical aperture (NA) of a recording lens, because the laser-light spot size is proportional to $(\lambda/NA)^2$. As a consequence of a smaller laser-light spot size the marks which are recorded are smaller. Therefore the storage capacity of a disc increases because more marks fit per unit area of the disc. An alternative option is the application of multiple recording layers. This is called double or dual layer recording, when two recording layers on the same side of the optical disc are used. When more than two recording layers on the same side of the optical disc are used, it is called multi layer recording For these new discs the complete erasure time (CET) has to be at most 60 ns. CET is defined as the minimum duration of an erasing pulse for complete crystallization of an amorphous mark in a crystalline environment, which is measured statically. For DVD-Rewritable, which may have a 4.7 GB recording density per 120 mm diameter disc, a user data bit rate of 33 Mbits/s is needed, and for DVR-red and -blue, wherein red and blue refer to the used laser-light wavelength, said data bit rate is 35 Mbits/s and 50 Mbits/s respectively. Each of these data bit rates rates can be translated to a maximum CET which is influenced by several parameters, e.g. thermal design of the recording stacks and the recording layer materials used.

For double layer recording, the first recording stack must be sufficiently transmissive to ensure proper read/write characteristics of the second recording stack. The known medium from U.S. Pat. No. 6,190,750 has a $|IP_1IM_1I^+|S|IP_2IM_2|$ structure for rewritable phase change recording which has two metal layers of which the first, $M_1$, is relatively thin and has a high optical transmission and of which the second, $M_2$, is a mirror with high optical reflection. I represents a dielectric layer, $I^+$ represents a further dielectric layer, P1, on which the laser light is incident first, and $P_2$ represent phase change recording layers, and S represents a transparent spacer layer. The metal layers not only serve as a reflective mirror, but also as a heat sink to ensure rapid cooling for quenching the amorphous phase during writing. The recording and erasing behavior of the two recording layers $P_1$ and $P_2$, which are made of the same or of very similar material, is different due to their position in the stack. The $P_1$ layer is present proximate a relatively thin metal layer $M_1$ with limited heat sink capacity while the $P_2$ layer is present proximate a relatively thick metal mirror layer $M_2$ which causes substantial cooling of the $P_2$ layer during recording. The cooling behavior of a recording layer determines to a large extend the required laser-light write pulse strategy and the required recording-velocity of the laser-light beam during recording. Furthermore, the relatively thin metal layer $M_1$ inevitably blocks a substantial part of the laser-light causing a reduced recording power at the $P_2$ layer.

It is a disadvantage of the known medium that the recording and erasing behavior of the first and second recording layer is substantially different. This requires a different laser light write pulse strategy and recording velocity for each of the recording layers, which causes the recording apparatus to be more complex.

It is an object of the invention to provide an optical information medium of the kind described in the opening paragraph, in which an optimal recording and erasing behavior is achieved with a laser-light write pulse strategy which is substantially equal for the recording layers and a recording velocity which is substantially equal for the recording layers.

This object is achieved in that
- the first, recording stack comprises a phase change type recording layer of a kind selected from a kind with substantially growth dominated crystallization and a kind with substantially nucleation dominated crystallization and
- the second recording stack comprises a phase change type recording layer of a kind different from the kind selected for the first recording stack.

The principle of the optical information medium of the invention can be schematically explained by e.g. the following layer structure:

$$|IP_1I|S|IP_2I|M|$$

wherein $IP_1I$ is the first recording stack, $IP_2I$ is the second recording stack, wherein I and S have the above-mentioned meaning, M is a metal mirror layer and $P_1$ and $P_2$ are phase change type recording layers of a different kind. During recording and reading the laser-light beam of an optical recorder is incident via the first recording stack. The substrate on which the layer structure is disposed can either be present adjacent the metal layer M, in which event the laser-light beam enters via the first recording stack without passing the substrate, or adjacent the first recording stack, in which event the laser-light beam enters via the first recording stack after passing the substrate layer. At the side of the layer structure, which is remote from the substrate, a cover layer may be present, which protects the layer structure from the environment.

The invention is based on the insight that the crystallization kinetics of the recording layers has to be matched with the thermal and/or optical properties of the layers adjacent the recording layers by the choice of material of the recording layer. Two mechanisms of crystallization are known: growth dominated and nucleation dominated crystallization. The presence of a metal mirror M causes the second recording stack to be a relatively fast cooling structure because M acts as a heat sink, whereas the first recording stack is a relatively slowly cooling structure because of the absence of a metal heat sink. In other words the cooling rate, which is important for quenching the amorphous phase during writing, and the recording sensitivity are different for the recording stacks. By choosing recording layers with substantially different crystallization properties this can be compensated for. Addition of at least one transparent, and therefore relatively thin, metal layer adjacent the first recording stack is possible. The heat sink capacity of such an additional metal layer is relatively low. Such a layer may therefore be used to fine-tune the optical reflection and to fine-tune the heat sink capacity of the first recording stack.

During DOW, the speed with which amorphous phase recording marks can be recrystallized determines the data rate, which is inversely proportional to the CET. Before a new mark can be written, the present mark has to be erased completely. Thus the speed with which erasure or recrystallization can take place limits the maximum data rate of the recording medium. The first recording stack is a relatively slowly cooling structure and the recording layer must be thin in order to have sufficient laser light transmitted to the second recording stack.

When the phase change material of the recording layer of the second recording stack has a nucleation dominated crystallization and has a relatively low CET, the choice of the phase change material of the recording layer of the first recording stack is a material with growth dominated crystallization, having a relatively low CET. Choosing a nucleation dominated crystallization phase change material would result in a relatively high CET because nucleation of crystallites is less likely to occur when a layer is thin.

When the second recording stack has a phase change recording layer material with growth dominated crystallization and a relatively large CET, it is advantageous to choose a thin crystallization nucleation dominated recording layer in the first recording stack in order to match the behavior of the recording layer in the second recording stack.

The dielectric layers preferably are of a mixture of ZnS and SiO$_2$, e.g. (ZnS)$_{80}$(SiO$_2$)$_{20}$. Alternatively the layers may be of SiO$_2$, Ta$_2$O$_5$, TiO2, ZnS, Si$_3$N$_4$, AlN, Al$_2$O$_3$, MgO, ZnO, SiC, including their non-stoichiometric compositions. Especially Si$_3$N$_4$, AlN, Al$_2$O$_3$, MgO, ZnO, SiC are preferred because of their good thermal conductivity.

For the metal mirror layer metals such as Al, Ti, Au, Ni, Cu, Ag, Rh, Pt, Pd, Ni, Co, Mn and Cr, and alloys of these metals, may be used. Examples of suitable alloys are AlTi, AlCr and AlTa. The thickness of this metal mirror layer is little critical, but preferably the transmission is practically zero for obtaining maximal reflection. In practice a layer of about 100 nm, which has an optical transmission of zero and which is easy to deposit, is frequently used.

In an embodiment the first recording stack comprises a phase change type recording layer of a kind selected from a kind with substantially growth dominated crystallization comprising a compound of Q, In, Sb and Te wherein Q is selected from the group of Ag and Ge, and a kind with substantially nucleation dominated crystallization comprising a compound of Ge, Sb and Te.

Useful as a recording layer with substantially growth dominated crystallization is a compound of Q, In, Sb and Te, wherein Q is selected from the group of Ag and Ge, and wherein the atomic composition of the compound is defined by the formula $Q_aIn_bSb_cTe_d$, and $0<a\leq15$, $0<b\leq6$, $55\leq c\leq80$, $16\leq d\leq35$, $a+b+c+d=100$.

Especially useful as a recording layer with substantially growth dominated crystallization are the compounds described in the international patent application WO 01/13370. In this application compounds are described with an atomic composition which is defined by the formula $Q_aIn_bSb_cTe_d$, where $2\leq a\leq9$, $0<b\leq6$, $55\leq c\leq80$, $16\leq d\leq30$, a $+b+c+d=100$ and Q is Ag or Ge. These compounds show a relatively fast growth dominated crystallization speed.

Useful as the phase change type recording layer with substantially nucleation dominated crystallization is the compound of Ge, Sb and Te, and wherein the atomic composition of the compound is defined by an area in the ternary composition diagram Ge—Sb—Te, said area being of quadrangular shape having the vertices: Sb$_3$Te$_7$, Ge$_2$Te$_3$, Ge$_3$Te$_2$ and SbTe.

Especially useful as the phase change type recording layer with substantially nucleation dominated crystallization are the compounds described in U.S. Pat. No. 5,876,822. In this patent compounds are described with an atomic composition which is defined by the formula Ge$_{50x}$Sb$_{40-40x}$Te$_{60-10x}$, and $0.166\leq x\leq0.444$. These compounds show a relatively high nucleation dominated crystallization speed.

The phase change type recording layer of the first recording stack has a thickness between 5 and 15 nm. A thicker recording layer of the first recording stack would result in too low a transmission for the laser-light. The recording layer of the second recording stack may be thicker, e.g. between 10 and 35 nm.

The transparent spacer layer generally has a thickness of at least 10 micrometers and is present between the first and second recording stack. The thickness is larger than the depth of focus of the laser-light beam. The depth of focus of the laser-light beam is determined by the formula $\lambda/(2(NA)^2)$, where $\lambda$ is the wavelength of the laser-light and NA is the numerical aperture of the read/write objective lens. A transparent spacer layer thickness that is substantially larger than this depth of focus ensures that the first and the second recording stack are optically decoupled, i.e. a laser-light beam focused on the recording layer of the first recording stack does not read/write information from/onto the recording layer of the second recording stack, and vice versa. In this way the storage capacity is doubled with respect to a single-layered information medium. The material of the transparent spacer layer is e.g. a UV-cured acrylate adhesive or resin, in which servotracks may be provided by a replication process.

In the first recording stack the dielectric layer, on which the laser-light beam is first incident, protects the recording layer from humidity, protects neighboring layers from a thermal damage, and optimizes the optical contrast. From the viewpoint of jitter, the thickness of this dielectric layer is preferably at least 70 nm. Jitter is a measure of the distortion of the shape of a recording mark, and is measured as a time shift of rising and falling edges in the information signal. In view of optical contrast, the thickness of this layer preferably is substantially equal to $(70+\lambda/2n)$ nm, wherein $\lambda$ is the wavelength of the laser-light beam, and n is the refractive index of the dielectric layer. In the second recording stack, the dielectric layer between the transparent spacer layer and the recording layer has a thickness within the same range for the same reasons. However, deviations from these preferred values are possible.

In the second recording stack, the dielectric layer between the recording layer and the metal mirror layer has a thickness between 10 and 50 nm, preferably between 20 and 40 nm. When this layer is thinner than 10 nm, the thermal insulation between the recording layer and the metal mirror layer is too low. As a result, the cooling rate of the second recording layer is increased, which leads to a poor crystallization and a poor cyclability. When this layer is thicker than 50 nm, the thermal insulation between the recording layer and the metal mirror layer is too high. The cooling rate is decreased and thus the quenching speed of the recording layer of the medium during writing is decreased which hampers the formation of amorphous marks.

The dielectric layer of the first recording stack, which is present between the first recording layer and the transparent spacer layer, is optimized for a maximum transmission, and its thickness depends on the refractive index n of the dielectric material.

The substrate of the information medium consists, for example, of polycarbonate, polymethyl methacrylate (PMMA), amorphous polyolefin or glass. In a typical example, the substrate is disc-shaped and has a diameter of 120 mm and a thickness of 0.6 or 1.2 mm. If the laser-light beam enters the medium via the entrance face of the substrate, the first recording stack is present adjacent the substrate and the substrate is at least transparent for the laser-light.

Alternatively the laser-light enters the medium via a cover layer which is present adjacent the first recording stack. The substrate is then present adjacent the metal mirror. For instance, a cover layer is used for the new 60 mm radius Digital Video Recording (DVR) disc. This disc is written and read out through this cover layer, which therefore has to be of good optical quality. Suitable materials as a cover layer are for example, UV-light cured poly(meth)acrylate, In case the recording stacks are written and read through the cover layer, the substrate does not necessarily have to be transparent to the laser-light.

At least one additional recording stack may be present which is separated from the first and the second recording stack by at least one additional transparent spacer layer, the recording layer of which additional recording stack being of the phase change type and having crystallization kinetics that matches the laser-light write pulse strategy and the recording velocity of the recording layer of the first and the second recording stack.

The surface of the disc-shaped substrate on the side of the recording stacks preferably is provided with a servo track that can be scanned optically. This servo track often is a spiral-shaped groove and is formed in the substrate by means of a mould during injection molding or pressing. These grooves can be alternatively formed in a replication process in the synthetic resin of the transparent spacer layer, for example, a UV light-curable acrylate.

The metal mirror layer and the dielectric layers have been provided by vapor deposition or sputtering.

The phase change recording layer has been applied to the substrate by vacuum deposition, electron beam vacuum deposition, chemical vapor deposition, ion plating or sputtering.

The invention will be elucidated in greater detail by means of an exemplary embodiment and with reference to the accompanying drawing, in which FIG. 1 shows a schematic cross-sectional view of the optical information medium in accordance with the invention. The dimensions are not drawn to scale.

EXEMPLARY EMBODIMENT

FIG. 1 shows the layer structure of an optical information medium for rewritable recording by means of a laser-light beam 14 or 15. The medium comprises a substrate 1. On a side of the substrate a first recording stack 8, comprising a phase change type recording layer 10, is present. The recording layer 10 is sandwiched between two dielectric layers 9 and 11 which are, for example, made of $(ZnS)_{80}(SiO_2)_{20}$ with a thickness of e.g. 100 nm and 90 nm respectively.

A second recording stack 2 is present, comprising a phase change type recording layer 5, The recording layer 5 is sandwiched between two dielectric layers 4 and 6 which are, for example, made of $(ZnS)_{80}(SiO_2)_{20}$ with a thickness of e.g. 25 nm and 95 nm respectively.

A transparent spacer layer 7 is interposed between the first recording stack 8 and the second recording stack 2, and has a thickness larger than the depth of focus of the laser-light beam 14 or 15. The transparent spacer layer 7 may e.g. be a UV-cured acrylate with a thickness of e.g. 50 μm.

A metal mirror layer 3, e.g. made of aluminium with a thickness of 100 nm, is present proximate the second recording stack 2 and at the side of the second recording stack opposite to the side of the transparent spacer layer 7. The first recording stack 8 comprises a phase change type recording layer 10 of a kind with substantially growth dominated crystallization or a kind with substantially nucleation dominated crystallization. In this embodiment the first recording stack 8 comprises a phase change type recording layer 10 of a kind with substantially nucleation dominated crystallization comprising a compound of Ge, Sb and Te. Suitable is e.g. the stoichiometric compound $Ge_2Sb_2Te_5$, with a thickness of e.g. 7 nm. The second recording stack 2 comprises a phase change type recording layer 5 of a kind different from the kind selected for the first recording stack 8. Suitable is e.g. the compound of Ge, In, Sb and Te with atomic composition $Ge_{1.9}In_{0.1}Sb_{68}Te_{30}$, with a thickness of 15 nm, with substantially growth dominated crystallization.

Substrate 1 is a polycarbonate disc-shaped substrate having a diameter of 120 mm and a thickness of 0.6 mm.

A cover layer 12, made of e.g. a UV cured resin Daicure SD645, with a thickness of 100 μm is present adjacent dielectric layer 11.

The initial crystalline state of the recording layers 5 and 10 is obtained by heating the as-deposited amorphous alloy with a focused laser beam in a recorder.

A laser-light beam 14 for recording, reproducing and erasing of information is focused onto recording layer 10 of the first recording stack 8, and enters the stack 8 via the cover layer 12. Laser-light beam 15 is focused onto recording layer 5 of the second recording stack 2.

The first recording stack has a transmission of about 67% in the amorphous state and a transmission of about 47% in the crystalline state. The first recording stack has a reflection of about 1.6% in the amorphous state and a reflection of about 8.2% in the crystalline state. The second recording stack has an effective reflection of about 0.9% in the amorphous state and an effective reflection of about 8.5% in the crystalline state. The word effective meaning as "seen" through the first recording stack. The stacks have good recording properties. The jitter is below 13% up to 4000 overwrite cycles.

The invention provides a rewritable phase change optical information medium, such as DVD-Rewritable or DVR, with at least two recording layers, disposed on a side of a substrate, and which recording layers require a substantially equal recording velocity and a substantially equal laser-light write pulse strategy.

What is claimed is:

1. An optical information medium for rewritable recording by means of a laser-light beam, said medium comprising a substrate having disposed on a side thereof:
    a first recording stack including a phase change type recording layer, sandwiched between two dielectric layers,
    a second recording stack including a phase change type recording layer, sandwiched between two dielectric layers;
    a transparent spacer layer, interposed between the first and the second recording stack, having a thickness larger than the depth of focus of the laser-light beam, and
    a metal mirror layer proximate the second recording stack and at a side of the second recording stack remote from the transparent spacer layer; and wherein:
        the first recording stack includes a phase change type recording layer of a kind selected from a kind with substantially growth dominated crystallization and a kind with substantially nucleation dominated crystallization; and
        the second recording stack includes a phase change type recording layer of a kind different from the kind selected for the first recording stack.

2. The optical information medium of claim 1, wherein the first recording stack includes a phase change type recording layer of a kind selected from a kind with substantially growth dominated crystallization comprising a compound of Q, In, Sb and Te wherein Q is selected from the group of Ag and Ge, and a kind with substantially nucleation dominated crystallization comprising a compound of Ge, Sb and Te.

3. The optical information medium as claimed in claim 2, wherein the atomic composition of the compound of Q, In, Sb and Te is defined by the formula $Q_a In_b Sb_c Te_d$, and $0<a\leq15$, $0<b\leq6$, $55\leq c\leq80$, $16\leq d\leq35$, $a+b+c+d=100$.

4. The optical information medium of claim 2, wherein the atomic composition of the compound of Ge, Sb and Te is defined by an area in the ternary composition diagram Ge—Sb—Te, said area being of quadrangular shape having the vertices: $Sb_3Te_7$, $Ge_2Te_3$, $Ge_3Te_2$, and SbTe.

5. An optical information medium as claimed in claim 4, wherein the atomic composition of the compound of Ge, Sb and Te is defined by the formula $Ge_{50x}Sb_{40-40x}Te_{60-10x}$, and $0.166\leq x\leq0.444$.

6. The optical information medium of claim 1, wherein:
    the phase change type recording layer of the first recording stack has a thickness between 5 and 15 nm, and
    the phase change type recording layer of the second recording stack has a thickness between 10 and 35 nm.

7. The optical information medium of claim 1, wherein the transparent spacer layer has a thickness of at least 10 micrometers.

* * * * *